(12) United States Patent
Matsumoto

(10) Patent No.: US 10,862,687 B2
(45) Date of Patent: Dec. 8, 2020

(54) COMMUNICATION SYSTEM FOR SUPPRESSING A PROCESSING LOAD OF AN ECU WHEN DEALING WITH FRAUDULENT MESSAGES

(71) Applicant: TOYOTA JIDOSHA KABUSHIKI KAISHA, Toyota (JP)

(72) Inventor: Masatoshi Matsumoto, Hamamatsu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 174 days.

(21) Appl. No.: 15/784,641

(22) Filed: Oct. 16, 2017

(65) Prior Publication Data

US 2018/0139052 A1 May 17, 2018

(30) Foreign Application Priority Data

Nov. 14, 2016 (JP) .................................. 2016-221925

(51) Int. Cl.
*H04L 9/32* (2006.01)
*H04L 29/08* (2006.01)
(Continued)

(52) U.S. Cl.
CPC .......... *H04L 9/3242* (2013.01); *B60R 16/023* (2013.01); *H04L 9/3297* (2013.01);
(Continued)

(58) Field of Classification Search
CPC . H04L 9/00; H04L 63/00; H04L 63/20; H04L 63/14; H04L 12/28; H04L 67/12;
(Continued)

(56) References Cited

U.S. PATENT DOCUMENTS

| 8,964,624 | B2 * | 2/2015 | Choi ..................... H04W 36/02 370/315 |
| 9,614,767 | B2 * | 4/2017 | Horihata ........... H04L 12/40039 |

(Continued)

FOREIGN PATENT DOCUMENTS

| DE | 102012219093 A1 | 4/2013 |
| DE | 112016003907 T5 | 5/2018 |

(Continued)

*Primary Examiner* — Theodore C Parsons
*Assistant Examiner* — Sangseok Park
(74) *Attorney, Agent, or Firm* — Hunton Andrews Kurth LLP

(57) ABSTRACT

A communication system includes a first electronic control unit configured to determine whether a reception message received from a communication bus corresponds to a communication message determined in advance to be transmitted to the communication bus by the first electronic control unit, determine whether the communication message is transmitted from the first electronic control unit to the communication bus, and output a notification signal that is a signal for causing the communication message that a second electronic control unit acquires from the communication bus to be deleted from the second electronic control unit when the first electronic control unit determines that the reception message corresponds to the communication message and determines that the communication message is not transmitted from the first electronic control unit to the communication bus.

5 Claims, 8 Drawing Sheets

(51) Int. Cl.
  *H04L 12/40*     (2006.01)
  *B60R 16/023*    (2006.01)
  *H04L 29/06*     (2006.01)

(52) U.S. Cl.
  CPC .............. *H04L 12/40* (2013.01); *H04L 67/12* (2013.01); *H04L 67/306* (2013.01); *H04L 2012/40273* (2013.01)

(58) Field of Classification Search
  CPC ...... G06F 21/00; G06F 21/577; G06F 21/606; G06F 21/71; G06F 21/85; G06F 2221/2101; H04W 12/00; H04W 4/40; B60R 16/023
  See application file for complete search history.

(56) References Cited

U.S. PATENT DOCUMENTS

| | | | |
|---|---|---|---|
| 2010/0234968 A1* | 9/2010 | Kurachi | G05B 9/02 700/3 |
| 2011/0307123 A1* | 12/2011 | Abe | G07C 9/00182 701/2 |
| 2013/0104231 A1 | 4/2013 | Niner et al. | |
| 2014/0310530 A1 | 10/2014 | Oguma et al. | |
| 2014/0334300 A1* | 11/2014 | Horihata | H04L 12/40039 370/230 |
| 2014/0355452 A1* | 12/2014 | Nii | B60R 16/023 370/242 |
| 2017/0026386 A1* | 1/2017 | Unagami | H04L 63/14 |
| 2017/0237769 A1* | 8/2017 | Ookawa | H04L 45/26 726/22 |
| 2019/0007234 A1 | 1/2019 | Takada et al. | |

FOREIGN PATENT DOCUMENTS

| | | | | |
|---|---|---|---|---|
| JP | 2013-098719 A | 5/2013 | | |
| JP | 2013187555 A | 9/2013 | | |
| JP | 2014091487 A | 5/2014 | | |
| JP | 2015065546 A | 4/2015 | | |
| JP | 2016113122 A | 6/2016 | | |
| WO | WO-2013061396 A1 * | 5/2013 | ............ | H04L 29/02 |
| WO | 2014199687 A1 | 12/2014 | | |

* cited by examiner

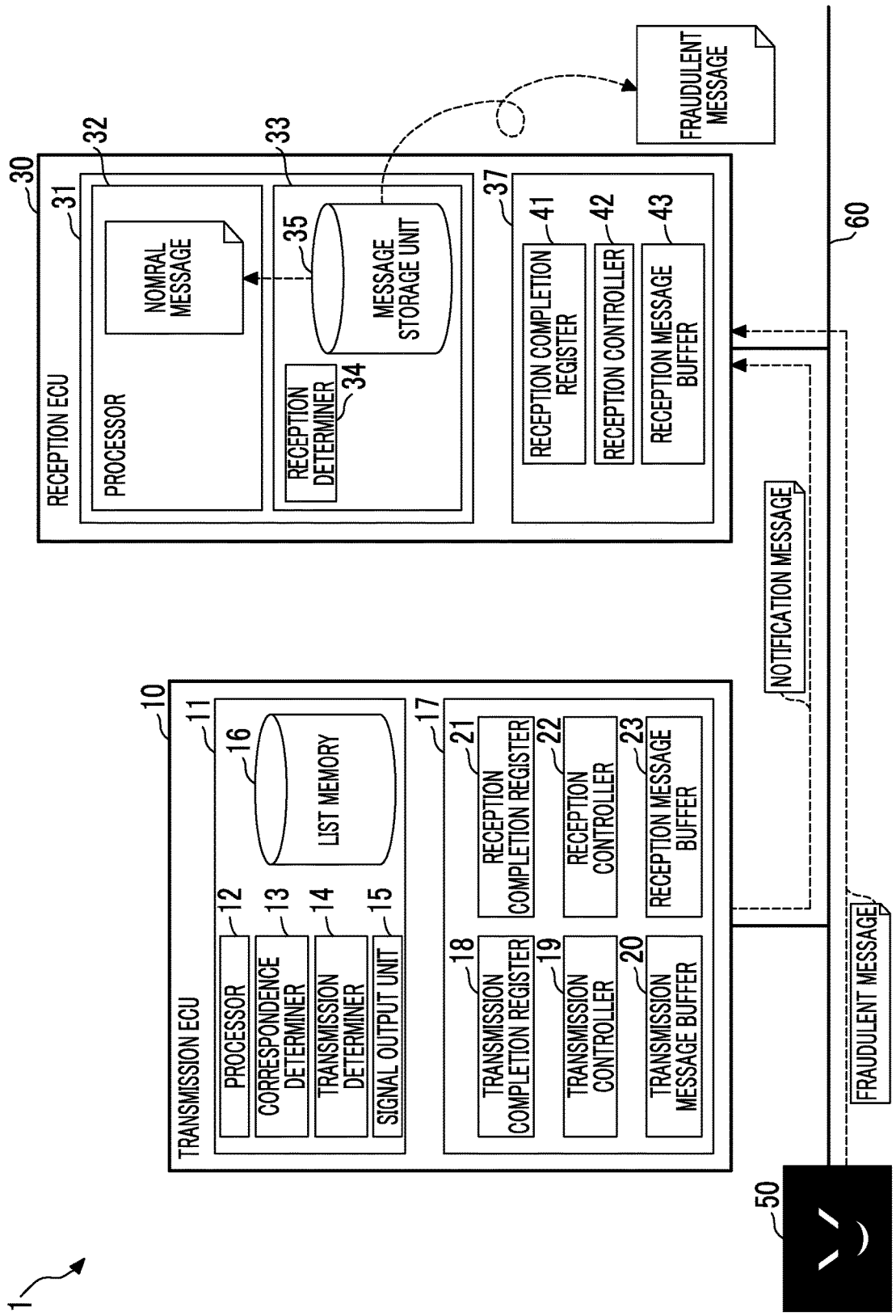

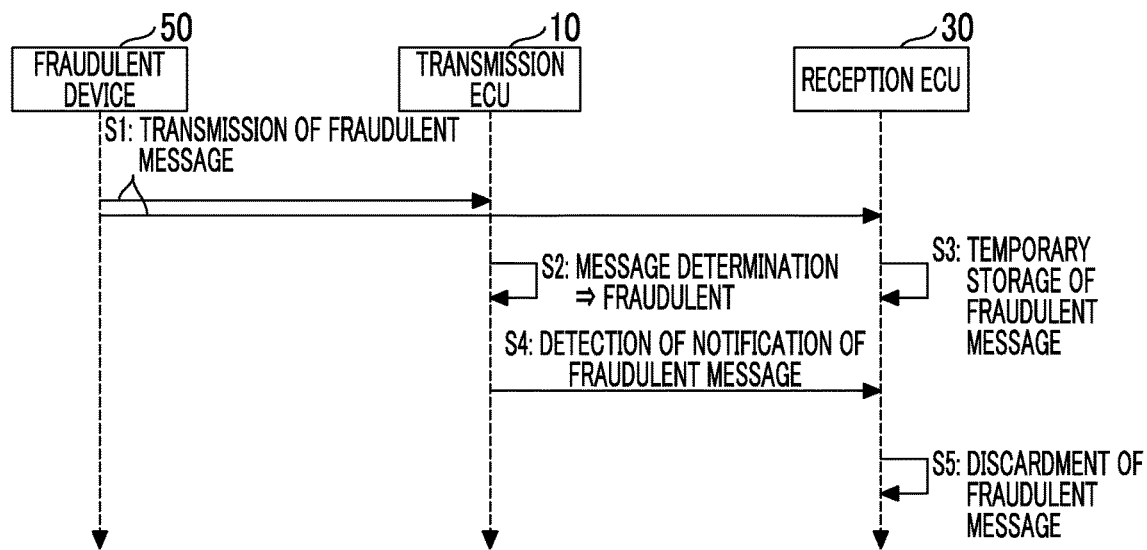
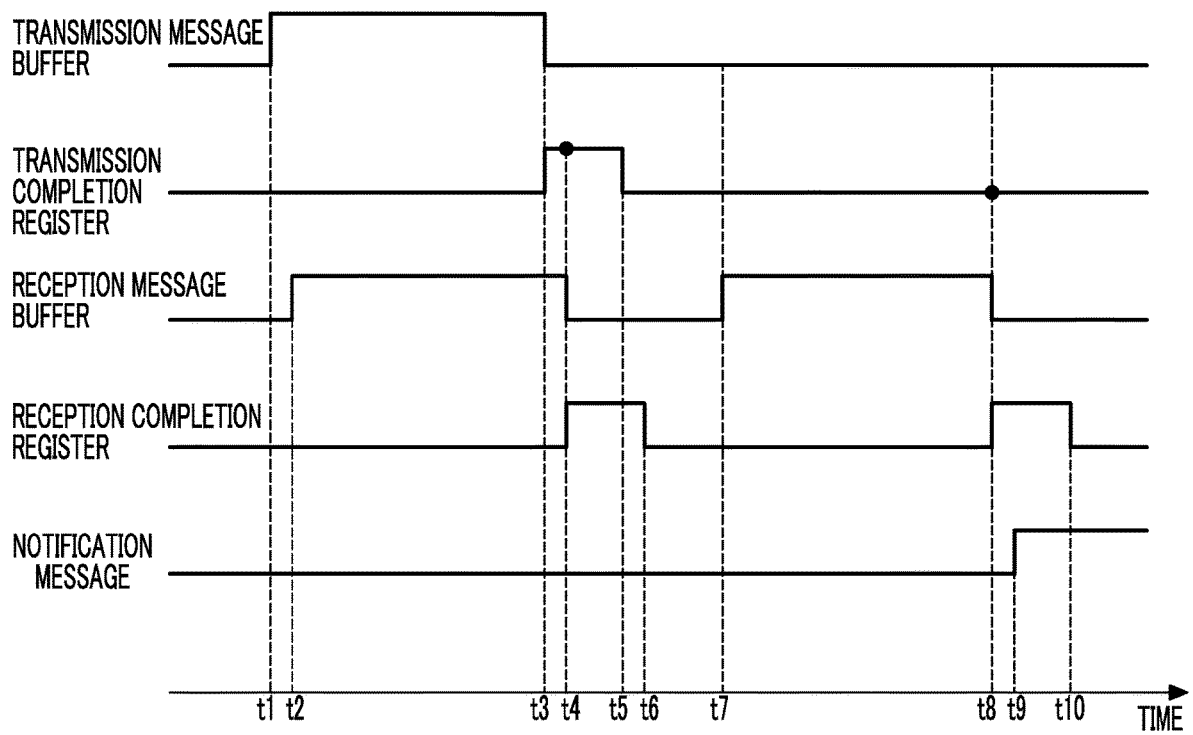

COMMUNICATION SYSTEM FOR SUPPRESSING A PROCESSING LOAD OF AN ECU WHEN DEALING WITH FRAUDULENT MESSAGES

INCORPORATION BY REFERENCE

The disclosure of Japanese Patent Application No. 2016-221925 filed on Nov. 14, 2016 including the specification, drawings and abstract is incorporated herein by reference in its entirety.

BACKGROUND

1. Technical Field

The disclosure relates to a communication system.

2. Description of Related Art

In the related art, a method of using a message authentication code (MAC) to guarantee authenticity of a message that is transferred via a communication bus in a communication system mounted on a vehicle is known (for example, Japanese Unexamined Patent Application Publication No. 2013-98719 (JP 2013-98719 A)).

In JP 2013-98719 A, a transmission electronic control unit (ECU) on the message transmission side transmits a main message, and an MAC message including an MAC generated using a common encryption key based on the main message to the communication bus. A reception ECU on the message reception side compares the MAC generated using the common encryption key based on the main message received from the communication bus with an MAC included in the MAC message received from the communication bus.

The reception ECU determines that the main message received from the communication bus is an authorized one and processes the main message when the two MACs are the same. On the other hand, the reception ECU determines that the main message received from the communication bus is a fraudulent one and does not process the main message when the two MACs are different.

SUMMARY

However, in the related art, since each ECU needs to generate an MAC in order to cope with a fraudulent message, a processing load of the ECU for coping with the fraudulent message is likely to increase.

Accordingly, the disclosure provides a communication system capable of suppressing a processing load of an ECU for coping with a fraudulent message.

An aspect of the disclosure relates to a communication system including: a first electronic control unit; a second electronic control unit; and a communication bus to which the first electronic control unit and the second electronic control unit are connected. The first electronic control unit is configured to control transmission of a message to the communication bus, control reception of a message from the communication bus, determine whether the reception message received from the communication bus corresponds to a communication message determined in advance to be transmitted to the communication bus by the first electronic control unit, determine whether the communication message is transmitted from the first electronic control unit to the communication bus, and output a notification signal that is a signal for causing the communication message that the second electronic control unit acquires from the communication bus to be deleted from the second electronic control unit when the first electronic control unit determines that the reception message corresponds to the communication message and determines that the communication message is not transmitted from the first electronic control unit to the communication bus.

Hereinafter, a case where the first electronic control unit determines that the reception message corresponds to the communication message and determines that the communication message is not transmitted from the first electronic control unit to the communication bus is referred to as "case X". According to the communication system of the aspect of the disclosure, in case X, a signal for causing the communication message that the second electronic control unit has acquired from the communication bus to be deleted from the second electronic control unit is output.

For example, a situation in which the first electronic control unit transmits, to the communication bus, a communication message determined in advance to be transmitted to the communication bus by the first electronic control unit is referred to as "situation A". In situation A, the first electronic control unit receives the communication message from the communication bus. Therefore, in situation A, the reception message that the first electronic control unit has received from the communication bus is determined to correspond to the communication message, and the communication message is determined to have been transmitted from the first electronic control unit to the communication bus.

On the other hand, a situation in which a fraudulent device other than the first electronic control unit disguises itself as the first electronic control unit and transmits, to the communication bus, a communication message determined in advance to be transmitted to the communication bus by the first electronic control unit is referred to as "situation B". In situation B, since the first electronic control unit receives the communication message from the communication bus, the first electronic control unit determines that the reception message received from the communication bus corresponds to the communication message. However, in situation B, the first electronic control unit does not transmit the communication message to the communication bus. Therefore, in situation B, the first electronic control unit determines that the reception message that the first electronic control unit has received from the communication bus corresponds to the communication message, and determines that the communication message is not transmitted from the first electronic control unit to the communication bus. That is, in situation B, case X is established. Further, in situation B, since the fraudulent device transmits, to the communication bus, the communication message to be transmitted from the first electronic control unit, the communication message that the second electronic control unit has acquired from the communication bus corresponds to a fraudulent message that the fraudulent device has transmitted to the communication bus.

Therefore, in case X, the communication message that the second electronic control unit has acquired from the communication bus can be estimated not to be the communication message that the first electronic control unit has transmitted to the communication bus, and estimated to be the fraudulent message that the fraudulent device other than the first electronic control unit has transmitted to the communication bus.

In case X, in the communication system according to an aspect of the disclosure, the first electronic control unit outputs a signal for causing the communication message that the second electronic control unit has acquired from the communication bus to be deleted from the second electronic control unit.

When the signal is output in case X, the communication message (that is, in this case, the fraudulent message) that the second electronic control unit has acquired from the communication bus is deleted from the second electronic control unit. Thus, the second electronic control unit can take action to delete the fraudulent message without generating the MAC or performing authentication using the MAC as in the related art. Therefore, it is possible to suppress a processing load of the second electronic control unit for coping with the fraudulent message. Further, the first electronic control unit can take action to delete the fraudulent message by outputting the signal without generating the MAC as in the related art. Therefore, it is possible to suppress a processing load of the first electronic control unit for coping with the fraudulent message.

In the communication system according to the aspect, the second electronic control unit may be configured to store the communication message acquired from the communication bus, receive and process the stored communication message after a predetermined time has elapsed from acquisition of the communication message from the communication bus by the second electronic control unit, and delete the stored communication message in a case where there is reception or output of the notification signal until the predetermined time elapses.

According to the communication system of the aspect of the disclosure, in case X, the communication message (that is, in this case, the fraudulent message) that the second electronic control unit has acquired from the communication bus is deleted due to reception or output of the signal until the predetermined time has elapsed. Therefore, a message remaining after the predetermined time has elapsed is the communication message (that is, the authorized message) to be transmitted from the first electronic control unit. Thus, the second electronic control unit can correctly process the authorized message without incorrectly processing the fraudulent message by receiving and processing the stored communication message after the predetermined time has elapsed.

Further, the second electronic control unit receives and processes the stored communication message after the predetermined time has elapsed. Accordingly, even when the second electronic control unit acquires the message from the communication bus after the predetermined time has elapsed, the stored authorized message can be prevented from being overwritten with the acquired message without being received.

In the communication system according to the aspect, the first electronic control unit may be configured to cause the notification signal to be received by the second electronic control unit using the communication bus.

According to the communication system of the aspect of the disclosure, since the communication message and the signal are transferred via the common communication bus, it is possible to suppress cost of introduction of a new signal line for causing the signal to be received by the second electronic control unit.

In the communication system according to the aspect, the communication system may further include a notification bus that is a signal line other than the communication bus, wherein the first electronic control unit may be configured to cause the notification signal to be received by the second electronic control unit using the notification bus.

According to the communication system of the aspect of the disclosure, since the communication message and the signal are transferred via separate transmission path, it is possible to suppress an increase in a communication load of the communication bus and to suppress a transmission delay of the signal.

In the communication system according to the aspect, the first electronic control unit may be configured to turn off a power supply of the second electronic control unit by outputting the notification signal, and the second electronic control unit may be configured such that the communication message that the second electronic control unit acquires from the communication bus is deleted from the second electronic control unit by turning off the power supply.

According to the communication system of the aspect of the disclosure, since the power supply of the second electronic control unit is forcibly turned off due to the output of the signal, it is possible to rapidly delete the fraudulent message from the second electronic control unit.

In the communication system according to the aspect, the communication system may further include a relay including a coil and a first switch. The first switch may be connected between the second electronic control unit and a power supply of the second electronic control unit, and the coil may be connected between a power supply of the first electronic control unit and a ground of the first electronic control unit, the first electronic control unit may include a second switch that is provided between the ground of the first electronic control unit and the coil. The second switch may be configured to be turned on or off by the notification signal, and the power supply of the second electronic control unit may be turned off by turning the second switch off by the notification signal.

In the communication system according to the aspect, the first electronic control unit may be configured to store transmission completion data indicating that the transmission of a message to the communication bus is completed when transmission of the message to the communication bus has been completed, and may be configured to delete the stored transmission completion data from storage of the transmission completion data to subsequent execution of transmission of the message to the communication bus, and determine whether the communication message is transmitted from the first electronic control unit to the communication bus based on whether or not the transmission completion data is stored.

According to the communication system of the aspect of the disclosure, for example, in a case where the first electronic control unit has transmitted the communication message to be transmitted from the first electronic control unit to the communication bus, the transmission completion data is stored when the transmission of the communication message to the communication bus is completed. Therefore, since the first electronic control unit can determine that the communication message has been transmitted to the communication bus since the transmission completion data has been stored.

On the other hand, when a fraudulent device other than the first electronic control unit disguises itself as the first electronic control unit and transmits the communication message to be transmitted from the first electronic control unit to the communication bus, the first electronic control unit does not transmit the communication message to the communication bus. In this case, the transmission completion data is not stored. Therefore, the first electronic control unit can determine that the communication message is not transmitted from the first electronic control unit to the communication bus since the transmission completion data is not stored.

In the communication system according to the aspect, the first electronic control unit may be configured to determine whether the reception message corresponds to the communication message by matching the reception message with a communication message list.

According to the communication system of the aspect of the disclosure, for example, when the first electronic control unit transmits the communication messages to be transmitted from the first electronic control unit to the communication bus, the reception message is included in the list. Further, even when a fraudulent device other than the first electronic control unit disguises itself as the first electronic control unit and transmits the communication message to be transmitted from the first electronic control unit to the communication bus, the reception message is included in the list. Therefore, in the described case, since the reception message is included in the list, the first electronic control unit can determine that the reception message corresponds to the communication message.

On the other hand, when the authorized device has transmitted, to the communication bus, a communication message determined in advance to be transmitted to the communication bus by an authorized device other than the first electronic control unit, the reception message is not included in the list. Therefore, in this case, since the reception message is not included in the list, the first electronic control unit can determine that the reception message does not correspond to the communication message to be transmitted from the first electronic control unit.

According to the aspect of the disclosure, it is possible to suppress a processing load of the electronic control device for coping with the fraudulent message.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a diagram illustrating an example of a configuration of a communication system according to a first embodiment;

FIG. 2 is a diagram illustrating an example of an operation of the communication system according to the first embodiment;

FIG. 3 is a timing chart illustrating an example of an operation of a first electronic control unit according to the first embodiment;

DETAILED DESCRIPTION OF EMBODIMENTS

Figure 4:
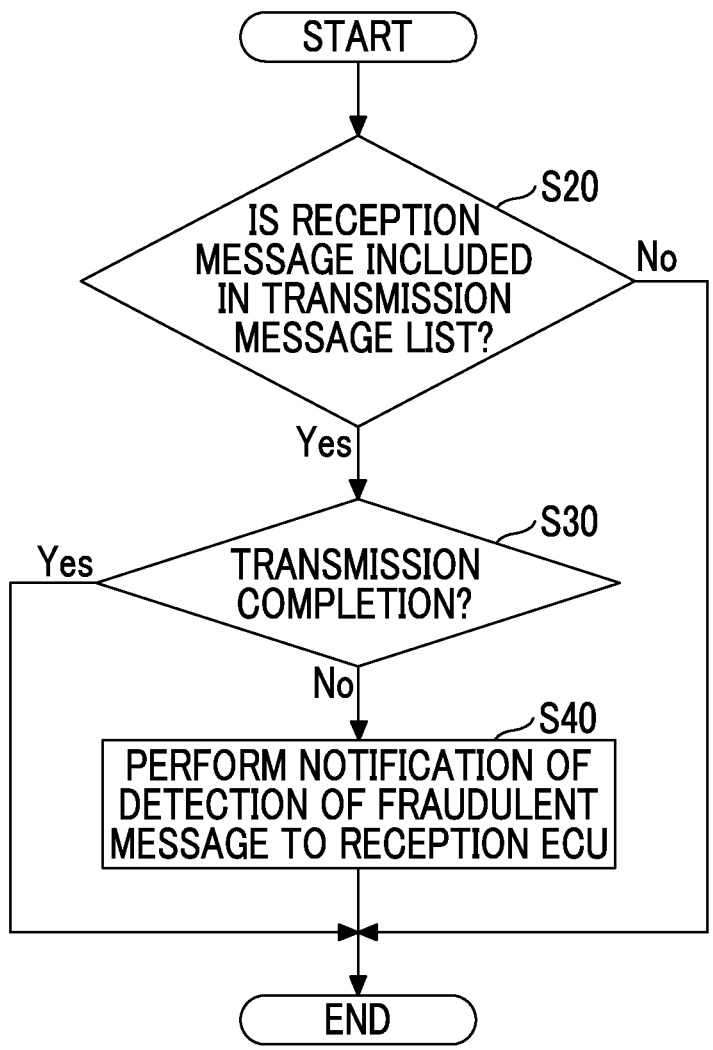
FIG. 4 is a flowchart illustrating an example of an operation of the first electronic control unit according to the first embodiment.

Hereinafter, embodiments of the disclosure will be described with reference to the drawings.

First Embodiment

FIG. 1 is a diagram illustrating an example of a configuration of a communication system according to a first embodiment. The communication system 1 illustrated in FIG. 1 is an example of a system mounted on a vehicle. The communication system 1 has a function of monitoring a fraudulent message that is transferred via a communication bus 60. The communication system 1 includes a transmission ECU 10, a reception ECU 30, and the communication bus 60. In the communication system 1, transmission and reception of a message between the transmission ECU 10 and the reception ECU 30 is performed through, for example, control area network (CAN) communication.

The transmission ECU 10 is connected to the communication bus 60 and transmits a communication message to the communication bus 60. The transmission ECU 10 is an example of a first electronic control unit. The reception ECU 30 is connected to the communication bus 60 and receives a message from the communication bus 60. The reception ECU 30 is an example of a second electronic control unit. The communication bus 60 is a transmission path via which a message transmitted and received between the transmission ECU 10 and the reception ECU 30 is transferred.

The transmission ECU 10 is an example of the first electronic control unit including a communication controller 17 and a microcomputer 11.

The communication controller 17 controls transmission and reception of messages between the microcomputer 11 and the communication bus 60. The microcomputer 11 monitors whether or not a fraudulent device 50 other than the transmission ECU 10 transmits a communication message to be transmitted to the communication bus 60 by the transmission controller 19 in the communication controller 17. A communication message that the transmission controller 19 transmits to the communication bus 60 indicates a communication message determined in advance to be transmitted to the communication bus 60 by the transmission ECU 10.

Hereinafter, a communication message that the transmission controller 19 transmits to the communication bus 60 is referred to as a "communication message M". The communication message M indicates a message determined in advance, from a communication specification, to be transmitted to the communication bus 60 by solely the transmission ECU 10 among a plurality of ECUs that are connected to the communication bus 60.

The reception ECU 30 is an example of the second electronic control unit including a communication controller 37 and a microcomputer 31.

The communication controller 37 controls transmission and reception of messages between the microcomputer 31 and the communication bus 60. The microcomputer 31 includes a filter 33 and a processor 32. The filter 33 temporarily stores, in a message storage unit 35, a reception message that a reception controller 42 in the communication controller 37 has received from the communication bus 60. The processor 32 receives the reception message temporarily stored in the message storage unit 35 from the filter 33 after a predetermined time has elapsed, and processes the received reception message.

The fraudulent device 50 is an unauthorized device that is connected to the communication bus 60. The fraudulent device 50 may be a device that is connected to the communication bus 60 via a connector, a gateway device, or the like or may be a device that is connected to the communication bus 60 via a wireless communication module (not illustrated).

In the transmission ECU 10, the reception controller 22 in the communication controller 17 may receive the communication message M from the communication bus 60 despite the fact that the transmission controller 19 does not transmit the communication message M to the communication bus 60. When the reception controller 22 receives the communication message M from the communication bus 60 despite the fact that the transmission controller 19 does not transmit the communication message M to the communication bus 60, the microcomputer 11 determines that the received communication message M is a fraudulent message that the fraudulent device 50 has transmitted.

When the microcomputer 11 determines that the received communication message M is a fraudulent message transmitted by the fraudulent device 50 (when the microcomputer 11 detects the fraudulent message), the microcomputer 11 notifies the reception ECU 30 of a notification message indicating the detection of the fraudulent message via the communication bus 60. Hereinafter, the notification message indicating detection of the fraudulent message is referred to as a "notification message N".

When receiving the notification message N from the communication bus 60, the reception ECU 30 deletes the communication message M acquired from the communication bus 60 and temporarily stored in the filter 33 as the fraudulent message.

Thus, the reception ECU 30 can take action to delete the fraudulent message without generating the MAC or performing authentication using the MAC as in the related art. Therefore, it is possible to suppress a processing load of the reception ECU 30 for coping with the fraudulent message. Further, the transmission ECU 10 can take action to delete the fraudulent message by outputting the notification message N without generating the MAC as in the related art. Therefore, it is possible to suppress a processing load of the transmission ECU 10 for coping with the fraudulent message.

FIG. 2 is a diagram illustrating an example of an operation of the communication system according to the first embodiment. FIG. 2 illustrates an example of an operation of the communication system 1 in a situation in which the fraudulent device 50 has transmitted the fraudulent message.

In step S1, the fraudulent device 50 disguises itself as the transmission ECU 10 and transmits a fraudulent message (that is, a communication message M to be transmitted by the transmission controller 19 of the transmission ECU 10) to the communication bus 60. The message transmitted from the fraudulent device 50 to the communication bus 60 is received by the transmission ECU 10 and the reception ECU 30.

In step S2, the microcomputer 11 of the transmission ECU 10 determines whether the reception message received in step S1 is included in a transmission message list held by the microcomputer 11 itself. The transmission message list indicates list data in which a plurality of communication messages M determined in advance to be transmitted to the communication bus 60 by the transmission ECU 10 has been written. The microcomputer 11 determines that the reception message received in step S1 is a fraudulent message since the reception message received in step S1 is included in the transmission message list despite the fact that the transmission controller 19 does not transmit the communication message M to the communication bus 60.

On the other hand, in step S3, the filter 33 of the reception ECU 30 temporarily stores the reception message received in step S1 in the message storage unit 35.

In step S4, when the microcomputer 11 determines that the reception message received in step S1 is a fraudulent message, the microcomputer 11 controls the transmission controller 19 so that the notification message N indicating that the fraudulent message has been detected is transmitted to the communication bus 60.

In step S5, when the communication controller 37 detects that the notification message N has been received from the communication bus 60, the filter 33 of the reception ECU 30 discards the reception message that has been stored in the message storage unit 35 through the reception in step S1.

Accordingly, even when the reception ECU 30 receives the fraudulent message transmitted from the fraudulent device 50 to the communication bus 60, the reception ECU 30 can delete the received fraudulent message from the reception ECU 30 by receiving the notification message N.

Next, a configuration of the communication system 1 illustrated in FIG. 1 will be described in more detail.

The transmission ECU 10 includes the microcomputer 11. The microcomputer 11 is an example of a microcomputer including a central processing unit (CPU), a random access memory (RAM), a read only memory (ROM), and the like. The microcomputer 11 includes a processor 12, a correspondence determiner 13, a transmission determiner 14, a signal output unit 15, and a list memory 16. Respective functions of the processor 12, the correspondence determiner 13, the transmission determiner 14, and a signal output unit 15 are realized by a program that is processed by the CPU. The list memory 16 is realized by a ROM.

The transmission ECU 10 includes a communication controller 17. The communication controller 17 includes a transmission completion register 18, a transmission controller 19, a transmission message buffer 20, a reception completion register 21, a reception controller 22, and a reception message buffer 23.

When a transmission request for the communication message M is generated, the processor 12 assigns an identification number to the communication message M and stores the communication message M to which the identification number is assigned in the transmission message buffer 20. An identification number with which the communication message M can be identified is assigned to the communication message M stored in the transmission message buffer 20. The identification number indicates a code for identifying the message that is transmitted and received via the communication bus 60. The communication controller 37 of the reception ECU 30 includes the reception controller 42 that determines whether the reception message is a message to be received by the reception ECU 30 by referring to the identification number assigned to the message received from the communication bus 60.

The transmission controller 19 controls transmission of the communication message M stored in the transmission message buffer 20 to the communication bus 60. When the communication message M is stored in the transmission message buffer 20, the transmission controller 19 tries to transmit the communication message M stored in the transmission message buffer 20 to the communication bus 60. When the communication message M wins over communication mediation with another message transferred via the communication bus 60, the transmission controller 19 stores the transmission completion data indicating that the transmission of the communication message M to the communication bus 60 has been completed, in the transmission completion register 18. The transmission completion register 18 is an example of a data storage unit. The transmission completion data is also referred to as transmission completion flag data.

The reception controller 22 controls reception of a message from the communication bus 60. The reception controller 22 is set such that the communication message M that the transmission controller 19 has transmitted to the communication bus 60 can also be received.

When the reception controller 22 determines that the reception message received from the communication bus 60 is the message to be received by the transmission ECU 10 based on the identification number assigned to the reception message received from the communication bus 60, the reception controller 22 stores the reception message in the reception message buffer 23. When the reception controller 22 has stored the reception message received from the communication bus 60 in the reception message buffer 23, the reception controller 22 stores reception completion data indicating that the reception of the reception message has been completed, in the reception completion register 21. The reception completion data is also referred to as reception completion flag data.

The correspondence determiner 13 determines whether the reception message that the reception controller 22 has received from the communication bus 60 corresponds to the communication message M to be transmitted to the communication bus 60 by the transmission controller 19. When the reception completion data is stored in the reception completion register 21, the correspondence determiner 13 acquires the reception message of which reception completion is indicated by the reception completion data from the reception message buffer 23.

The correspondence determiner 13, for example, determines whether the reception message corresponds to the communication message M by matching the reception message that the reception controller 22 has received from the communication bus 60 with the transmission message list through comparison of identification numbers.

The transmission message list indicates list data in which a plurality of communication messages M determined in advance to be transmitted to the communication bus 60 by the transmission ECU 10 has been written. The transmission message list is stored in, for example, the list memory 16 in advance.

For example, when the transmission controller 19 transmits the communication message M to the communication bus 60, the reception message that the reception controller 22 has received from the communication bus 60 is included in the transmission message list. Further, even when the fraudulent device 50 disguises itself as the transmission ECU 10 and transmits the communication message M to the communication bus 60, the reception message that the reception controller 22 has received from the communication bus 60 is included in the list. Therefore, in the described case, since the reception message that the reception controller 22 has received from the communication bus 60 is included in the transmission message list, the correspondence determiner 13 determines that the reception message corresponds to the communication message M.

On the other hand, when an authorized device other than the transmission ECU 10 has transmitted, to the communication bus 60, a communication message determined in advance to be transmitted to the communication bus 60 by the authorized device other than the transmission ECU 10, the reception message that the reception controller 22 has received from the communication bus 60 is not included in the transmission message list. Therefore, in this case, since the reception message that the reception controller 22 has received from the communication bus 60 is not included in the transmission message list, the correspondence determiner 13 determines that the reception message does not correspond to the communication message M.

The authorized device other than the transmission ECU 10 is one or a plurality of authorized devices connected to the communication bus 60. The authorized device may include the reception ECU 30 as long as the reception ECU 30 has the same transmission function as the transmission ECU 10.

The transmission determiner 14 determines whether the communication message M has been transmitted to the communication bus 60 by the transmission controller 19. For example, the transmission determiner 14 determines whether the communication message M has been transmitted to the communication bus 60 by the transmission controller 19 based on whether or not the transmission completion data has been stored in the transmission completion register 18. Specifically, the transmission determiner 14 determines that the communication message M for which the transmission completion data has been stored in the transmission completion register 18 has been transmitted to the communication bus 60 by the transmission controller 19. On the other hand, the transmission determiner 14 determines that the communication message M for which the transmission completion data has not been stored in the transmission completion register 18 has not been transmitted to the communication bus 60 by the transmission controller 19.

The signal output unit 15 outputs the notification message N when the correspondence determiner 13 determines that the reception message corresponds to the communication message M and the transmission determiner 14 determines that the communication message M has not been transmitted to the communication bus 60 by the transmission controller 19.

The notification message N is an example of a signal for deleting, from the reception ECU 30, the communication message M that the reception ECU 30 has acquired from the communication bus 60. The signal output unit 15 adds the identification number of the reception message (that is, the fraudulent message) determined to correspond to the communication message M and determined not to have been transmitted to the communication bus 60, to the notification message N. Thus, the filter 33 of the reception ECU 30 can delete the reception message (that is, the fraudulent message) with the same identification number as the identification number added to the notification message N from the message storage unit 35.

The signal output unit 15 causes the reception ECU 30 to receive the notification message N using the communication bus 60. Accordingly, since the communication message M and the notification message N are transferred via the common communication bus 60, it is possible to suppress the cost of introduction of a new signal line for causing the notification message N to be received by the reception ECU 30.

Meanwhile, the reception ECU 30 includes the microcomputer 31. The microcomputer 31 is an example of a microcomputer including a central processing unit (CPU), a random access memory (RAM), a read only memory (ROM), and the like. The microcomputer 31 includes a filter 33 and a processor 32. The filter 33 includes a reception determiner 34, and a message storage unit 35. Each function of the processor 32 and the reception determiner 34 is realized by a program that is processed by the CPU. The message storage unit 35 is realized by the RAM.

The reception ECU 30 includes the communication controller 37. The communication controller 37 includes a reception completion register 41, a reception controller 42, and a reception message buffer 43.

When the reception controller 42 determines that the reception message received from the communication bus 60 is a message to be received by the reception ECU 30, based on the identification number assigned to the reception message received from the communication bus 60, the reception controller 42 stores the reception message in the reception message buffer 43. When the reception controller 42 has stored the reception message received from the communication bus 60 in the reception message buffer 43, the reception controller 42 stores reception completion data indicating that the reception of the reception message has been completed, in the reception completion register 41. The reception completion data is also referred to as reception completion flag data.

When the reception completion data has been stored in the reception completion register 41, the reception determiner 34 acquires the reception message for which the reception completion has been indicated by the reception completion data from the reception message buffer 43. The reception determiner 34 temporarily stores the reception message acquired from the reception message buffer 43 in the message storage unit 35.

The reception determiner 34 may temporarily store all reception messages in the message storage unit 35 or may temporarily store solely some of the reception messages that are determined in advance in the message storage unit 35. For example, the reception determiner 34 may temporarily store solely some reception messages expected to have a relatively high suspicion of fraud in advance in the message storage unit 35 and provide the remaining reception messages other than some reception messages to the processor 32 without storing the remaining reception messages in the message storage unit 35. Thus, it is possible to shorten an average time from the reception of the reception message to processing in the processor 32 as compared with a case in which all reception messages are temporarily stored in the message storage unit 35.

The processor 32 receives the reception message temporarily stored in the message storage unit 35 from the filter 33 after a predetermined time has elapsed, and processes the received reception message. For example, the processor 32 uses the reception message received after the predetermined time has elapsed, for predetermined control. Specifically, the processor 32 uses the reception message received after the predetermined time has elapsed, for control to be executed in the reception ECU 30 or transmits the reception message to a device outside the reception ECU 30.

Next, an operation of the communication system 1 illustrated in FIG. 1 will be described.

FIG. 3 is a timing chart illustrating an example of an operation of the first electronic control unit according to the first embodiment. FIG. 3 illustrates an example of an operation of the transmission ECU 10.

The processor 12 stores the communication message M to which the identification number has been assigned, in the transmission message buffer 20 (timing t1). Thus, the transmission controller 19 starts to transmit the communication message M stored in the transmission message buffer 20 to the communication bus 60. The reception controller 22 starts to receive the communication message M that the transmission controller 19 starts to transmit, from the communication bus 60, and starts to store the communication message M that the reception controller 22 starts to receive, in the reception message buffer 23 (timing t2).

When the communication message M transmitted to the communication bus 60 wins over communication mediation with another message that is transferred via the communication bus 60, the transmission controller 19 can cause the transmission of the communication message M to be completed. When the transmission controller 19 causes the transmission of the communication message M to the communication bus 60 to be completed, the transmission controller 19 stores transmission completion data indicating that the transmission of the communication message M to the communication bus 60 has been completed, in the transmission completion register 18 (timing t3). When the reception controller 22 starts to receive the communication message M from the communication bus 60 and completes the storage of the communication message M in the reception message buffer 23, the reception controller 22 stores reception completion data indicating that the reception of the communication message M from the communication bus 60 has been completed, in the reception completion register 21 (timing t4).

Since the transmission completion data is stored in the transmission completion register 18 at timing t4, the transmission determiner 14 determines that the transmission controller 19 has transmitted to the communication message M indicating that the transmission of the transmission completion data has been completed, to the communication bus 60.

The transmission controller 19 deletes the transmission completion data from the transmission completion register 18 from the storage of the transmission completion data in the transmission completion register 18 to subsequent execution of the transmission of the message to the communication bus 60 (timing t5). The transmission controller 19 deletes, for example, the transmission completion data stored in the transmission completion register 18 after a certain predetermined time has elapsed.

The reception controller 22 deletes the reception completion data from the reception completion register 21 from the storage of the reception completion data in the reception completion register 21 to subsequent execution of the reception of the message from the communication bus 60 (timing t6). The reception controller 22 deletes, for example, the reception completion data stored in the reception completion register 21 after a certain predetermined time has elapsed.

On the other hand, when the fraudulent device 50 disguises itself as the transmission ECU 10 and transmits the communication message M to which the identification number has been assigned to the communication bus 60, the communication message M is not stored in the transmission message buffer 20 (timing t7). The reception controller 22 starts to receive the communication message M that the fraudulent device 50 starts to transmit, from the communication bus 60, and starts to store the communication message M that the reception controller 22 starts to receive, in the reception message buffer 23 (timing t7).

When the reception controller 22 starts to receive the communication message M from the communication bus 60 and completes the storage of the communication message M in the reception message buffer 23, the reception controller 22 stores reception completion data indicating that the reception of the communication message M from the communication bus 60 has been completed, in the reception completion register 21 (timing t8).

Since the transmission completion data is not stored in the transmission completion register 18 at timing t8, the transmission determiner 14 determines that the transmission controller 19 has not transmitted the communication message M to the communication bus 60.

The signal output unit 15 outputs the notification message N to delete the communication message M since the communication message M has not been transmitted to the communication bus 60 by the transmission controller 19 despite the fact that the communication message M is received by the reception controller 22 (timing t9). Since the notification message N is output, the communication message M received by the reception ECU 30 is deleted.

The reception controller 22 deletes the reception completion data from the reception completion register 21 from the storage of the reception completion data in the reception completion register 21 to subsequent execution of the reception of the message from the communication bus 60 (timing t10).

In FIG. 3, the reception controller 22 deletes the reception completion data from the reception completion register 21 from the storage of the reception completion data in the reception completion register 21 to subsequent execution of the reception of the message from the communication bus 60 (timing t6). This is because the transmission determiner 14 is prevented from erroneously determining that the transmission message of the fraudulent device 50 is the transmission message of the transmission ECU 10 in a situation in which the transmission message of the transmission ECU 10 and the transmission message of the fraudulent device 50 are continuous as illustrated. In the situation as illustrated, if the reception completion data is held in the reception completion register 21 until timing t8, the transmission determiner 14 erroneously determines that the transmission message of the fraudulent device 50 is the transmission message of the transmission ECU 10.

FIG. 4 is a flowchart illustrating an example of an operation of the first electronic control unit according to the first embodiment. FIG. 4 illustrates an example of a method in which the microcomputer 11 of the transmission ECU 10 detects the fraudulent message. A series of processes illustrated in FIG. 4 starts when the correspondence determiner 13 detects that the reception controller 22 has received the reception message from the communication bus 60.

The correspondence determiner 13 determines whether the reception message that the reception controller 22 has received from the communication bus 60 is included in the transmission message list to which a plurality of communication messages M to be transmitted to the communication bus 60 by the transmission controller 19 has been written (step S20).

The correspondence determiner 13 determines that the reception message does not correspond to the communication message M when the reception message that the reception controller 22 has received from the communication bus 60 is not included in the transmission message list. In this case, the flow ends.

On the other hand, the correspondence determiner 13 determines that the reception message corresponds to the communication message M when the reception message that the reception controller 22 has received from the communication bus 60 is included in the transmission message list. In this case, the process of step S30 is executed.

In step S30, the transmission determiner 14 determines whether the transmission of the communication message M is completed by the transmission controller 19.

When the transmission determiner 14 determines that the transmission of the communication message M is not completed by the transmission controller 19, the signal output unit 15 outputs a notification message N indicating the detection of the fraudulent message to the reception ECU 30 (step S40). In this case, the signal output unit 15 causes the identification number of the reception message (that is, the fraudulent message) determined to correspond to the communication message M and determined not to have been transmitted to the communication bus 60 to be included in the notification message N.

On the other hand, when the transmission determiner 14 determines that the transmission controller 19 completes the transmission of the communication message M, the signal output unit 15 does not output the notification message N. In this case, the flow ends.

Figure 5:
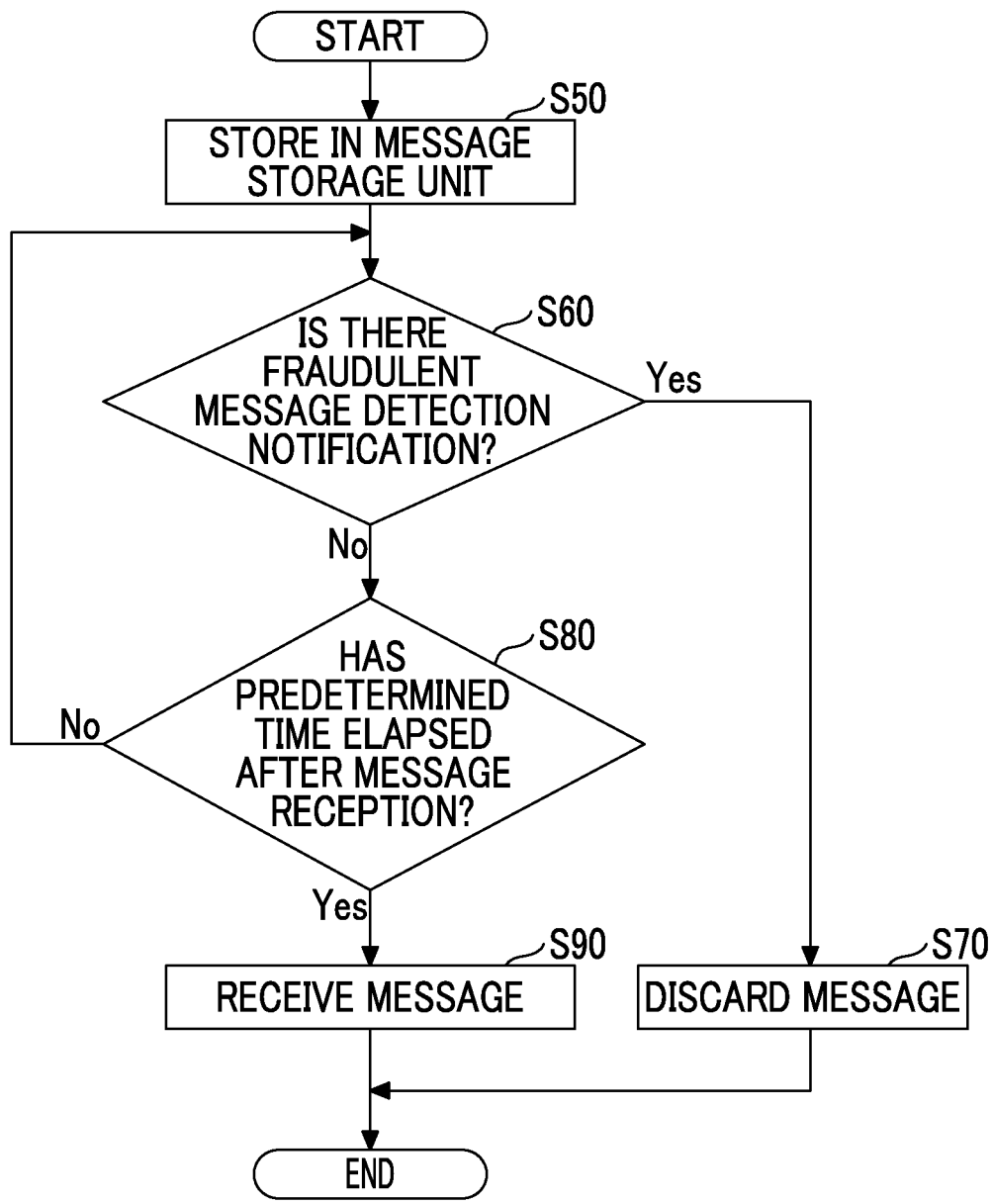
FIG. 5 is a flowchart illustrating an example of an operation of a second electronic control unit according to the first embodiment.

FIG. 5 is a flowchart illustrating an example of an operation of the second electronic control unit according to the first embodiment. FIG. 5 illustrates an example of a method in which the microcomputer 31 of the reception ECU 30 receives or discards the reception message. A series of processes illustrated in FIG. 5 starts when the reception determiner 34 detects that the reception controller 42 has received the reception message from the communication bus 60.

When the reception determiner 34 detects that the reception controller 42 has received the reception message from the communication bus 60, the reception determiner 34 acquires the reception message from the reception message buffer 43. The reception determiner 34 temporarily stores the acquired reception message in the message storage unit 35 (step S50).

The reception determiner 34 determines whether the notification message N indicating the detection of the fraudulent message is received by the reception controller 42 (step S60).

When the reception determiner 34 determines that the notification message N indicating the detection of the fraudulent message is received by the reception controller 42, the reception determiner 34 extracts the reception message (that is, the fraudulent message) with the same identification number as the identification number included in the notification message N from the message storage unit 35. The reception determiner 34 discards the extracted reception message (step S70). Thus, the fraudulent message received by the reception ECU 30 is deleted without being processed by the processor 32.

On the other hand, when the reception determiner 34 determines that the notification message N indicating the detection of the fraudulent message is not received by the reception controller 42, the reception determiner 34 performs a process of step S80. The reception determiner 34 determines whether a predetermined time has elapsed after the reception message is received (acquired) by the reception controller 42 from the communication bus 60 (step S80).

The reception determiner 34 performs the determination of step S60 again when a predetermined time has not elapsed from the reception of the reception message. On the other hand, when the reception determiner 34 determines that the predetermined time has elapsed from the reception of the reception message, a process of step S90 is performed.

In step S90, the processor 32 receives the reception message from the message storage unit 35 after a predetermined time has elapsed since the reception from the communication bus 60, and processes the received reception message. Thus, the processor 32 can correctly process the authorized message received by the reception ECU 30 without incorrectly processing the fraudulent message received by the reception ECU 30.

Thus, according to the first embodiment, the reception ECU 30 can take action to delete the fraudulent message without generating the MAC or performing authentication using the MAC as in the related art. Therefore, it is possible to suppress a processing load of the reception ECU 30 for coping with the fraudulent message. Further, the transmission ECU 10 can take action to delete the fraudulent message by outputting the notification message N without generating the MAC as in the related art. Therefore, it is possible to suppress a processing load of the transmission ECU 10 for coping with the fraudulent message.

Further, it is possible to delete the fraudulent message without using an encryption key. Accordingly, introduction of new plant equipment for preventing external leakage of an encryption key (for example, a secure room for writing a common encryption key to each ECU) is not needed. Further, it is possible to delete the fraudulent message without using the MAC. Therefore, it is possible to prevent a data size of the message from being reduced by a data size of the MAC.

Second Embodiment

Figure 6:
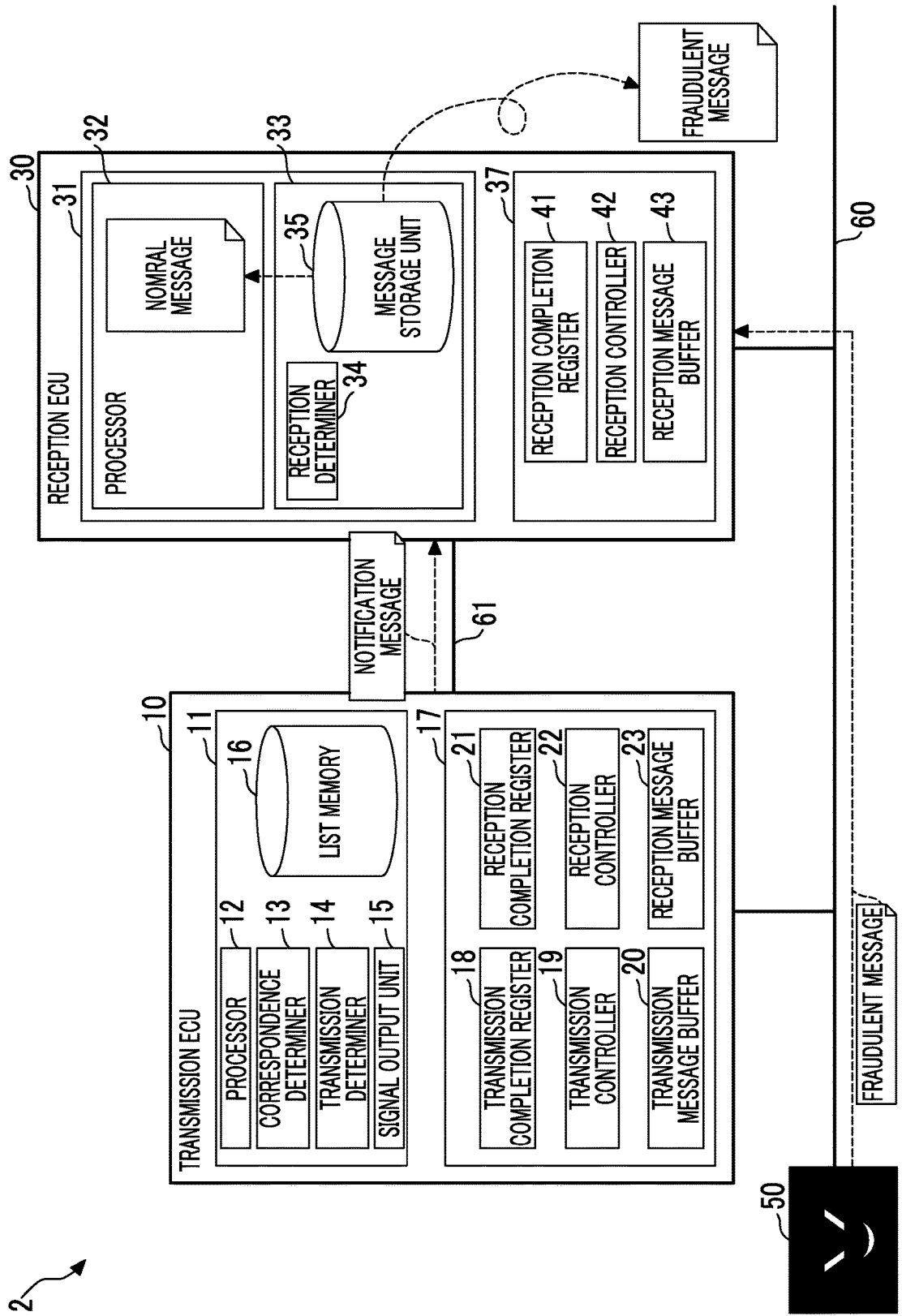
FIG. 6 is a diagram illustrating an example of a configuration of a communication system according to a second embodiment.

FIG. 6 is a diagram illustrating an example of a configuration of a communication system according to a second embodiment. A communication system 2 according to the second embodiment illustrated in FIG. 6 is different from the communication system 1 according to the first embodiment in that a signal line 61 other than the communication bus 60 is included. The described description of the first embodiment will be invoked for the same content as that in the first embodiment in a configuration and effects in the second embodiment.

In the communication system 2, the signal output unit 15 causes the reception ECU 30 to receive the notification message N using the signal line 61. Accordingly, since the communication message M and the notification message N are transferred via separate transmission paths, it is possible to suppress an increase in communication load of the communication bus 60 and to suppress a transmission delay of the notification message N.

When there is reception of the notification message N via the signal line 61 until a predetermined time elapses, the reception determiner 34 deletes the reception message (that is, the fraudulent message) with the same identification number as the identification number included in the notification message N from the message storage unit 35.

Third Embodiment

Figure 7:
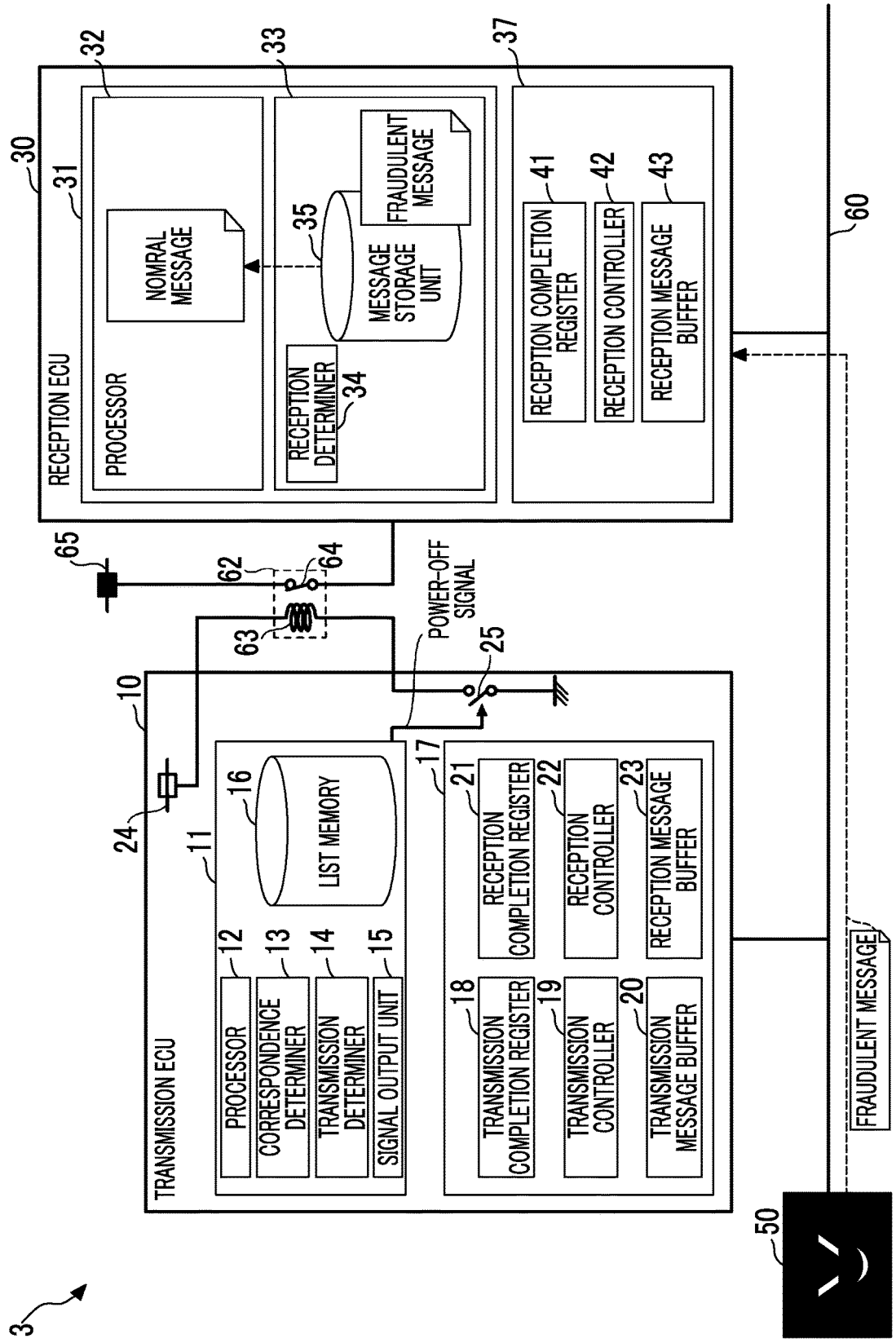
FIG. 7 is a diagram illustrating an example of a configuration of a communication system according to a third embodiment.

FIG. 7 is a diagram illustrating an example of a configuration of a communication system according to a third embodiment. A communication system 3 according to the third embodiment illustrated in FIG. 7 is different from the communication system 1 according to the first embodiment in that a fraudulent message is deleted from the message storage unit 35 using an output of a power-off signal. The described description of the first embodiment will be invoked for the same content as that in the first embodiment in a configuration and effects in the third embodiment.

In the communication system 3, the signal output unit 15 outputs the power-off signal to turn off a power supply 65 of the reception ECU 30. Since the power supply 65 is turned off, the communication message that the reception ECU 30 has acquired from the communication bus 60 is deleted from the message storage unit 35.

Thus, since the power supply 65 of the reception ECU 30 is forcibly turned off due to the output of the power-off signal, it is possible to rapidly delete the fraudulent message from the reception ECU 30.

The communication system 3 includes a relay 62. The relay 62 includes a coil 63 and a switch 64.

The signal output unit 15 outputs a power-off signal when the correspondence determiner 13 determines that the reception message corresponds to the communication message M and the transmission determiner 14 determines that the communication message M has not been transmitted to the communication bus 60 by the transmission controller 19.

The power-off signal is an example of a signal for deleting, from the reception ECU 30, the communication message M that the reception ECU 30 has acquired from the communication bus 60. The signal output unit 15 turns off a switch 25 using the output of the power-off signal. Thus, since a current flowing from the power supply 24 of the transmission ECU 10 to the coil 63 is cut off, the switch 64 is turned off. Since power supplied from the power supply 65 to the reception ECU 30 is cut off due to turn-off of the switch 64, the message storage unit 35 cannot hold the reception message stored until then. That is, the reception message stored in the message storage unit 35 is lost.

Figure 8:
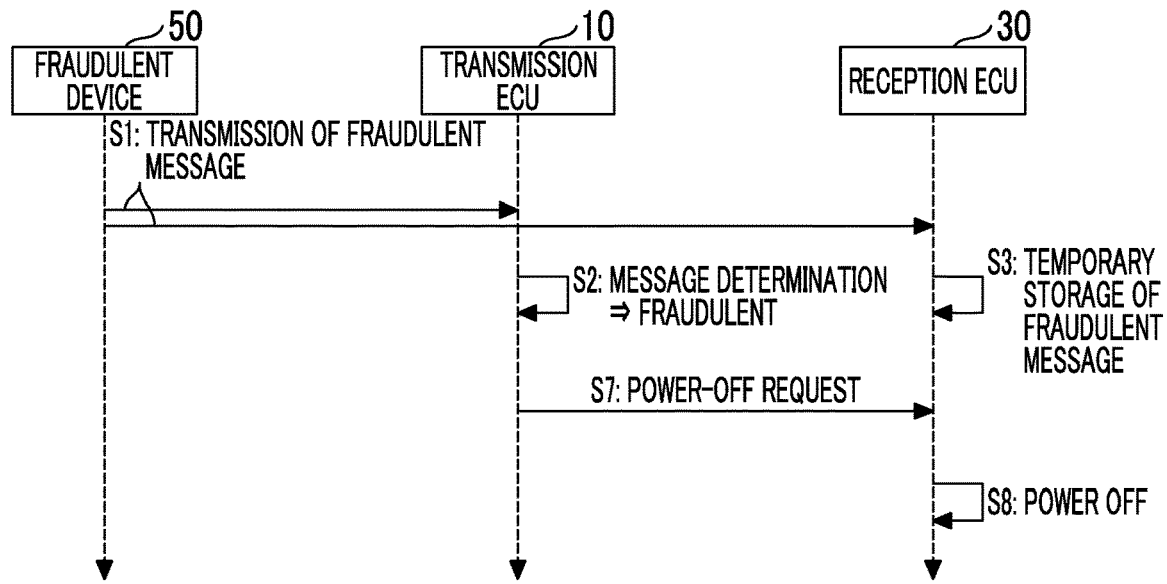
FIG. 8 is a diagram illustrating an example of an operation of the communication system according to the third embodiment.

FIG. 8 is a diagram illustrating an example of an operation of the communication system according to the third embodiment. FIG. 8 illustrates an example of an operation of the communication system 3 in a situation where the fraudulent device 50 transmits the fraudulent message.

Steps S1, S2, and S3 in FIG. 8 are the same as those in FIG. 2. In step S1, the fraudulent device 50 disguises itself as the transmission ECU 10 and transmits a fraudulent message (that is, a communication message M to be transmitted by the transmission controller 19 of the transmission ECU 10) to the communication bus 60. In step S2, the microcomputer 11 determines that the reception message received in step S1 is a fraudulent message since the reception message received in step S1 is included in the transmission message list despite the fact that the transmission controller 19 does not transmit the communication message M to the communication bus 60. On the other hand, in step S3, the filter 33 of the reception ECU 30 temporarily stores the reception message received in step S1 in the message storage unit 35.

In step S7, when the microcomputer 11 determines that the reception message received in step S1 is the fraudulent message, the signal output unit 15 of the microcomputer 11 outputs a power-off signal for turning off the relay 62.

In step S8, since the power supply 65 of the reception ECU 30 is turned off due to turn-off of the relay 62, the reception message stored in the message storage unit 35 through the reception in step S1 is lost.

Thus, even when the reception ECU 30 receives the fraudulent message transmitted from the fraudulent device 50 to the communication bus 60, the received fraudulent message can be deleted from the reception ECU 30 due to the turn-off of the power supply 65.

Figure 9:
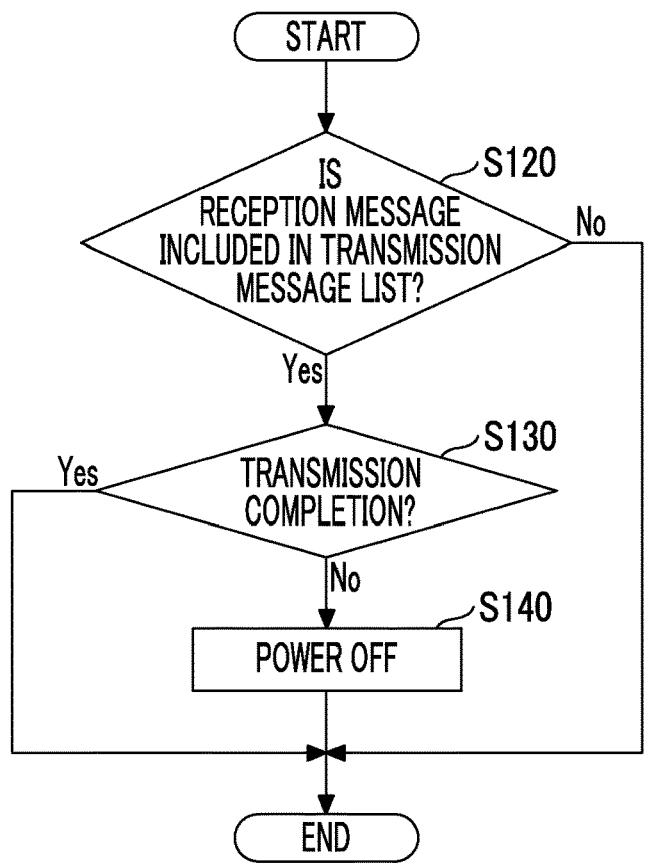
FIG. 9 is a flowchart illustrating an example of an operation of a first electronic control unit according to the third embodiment.

FIG. 9 is a flowchart illustrating an example of an operation of the first electronic control unit according to the third embodiment. FIG. 9 illustrates an example of a method in which the microcomputer 11 of the transmission ECU 10 detects a fraudulent message. A series of processes illustrated in FIG. 9 starts when the correspondence determiner 13 detects that the reception controller 22 has received the reception message from the communication bus 60. Steps S120 and S130 in FIG. 9 are the same as steps S20 and S30 in FIG. 4, respectively.

When the transmission of the communication message M is determined not to be completed by the transmission controller 19 in step S130, the signal output unit 15 outputs a power-off signal (step S140). On the other hand, when the transmission of the communication message M is determined to be completed by the transmission controller 19 in step S130, the signal output unit 15 does not output the power-off signal. In this case, the flow ends.

Figure 10:
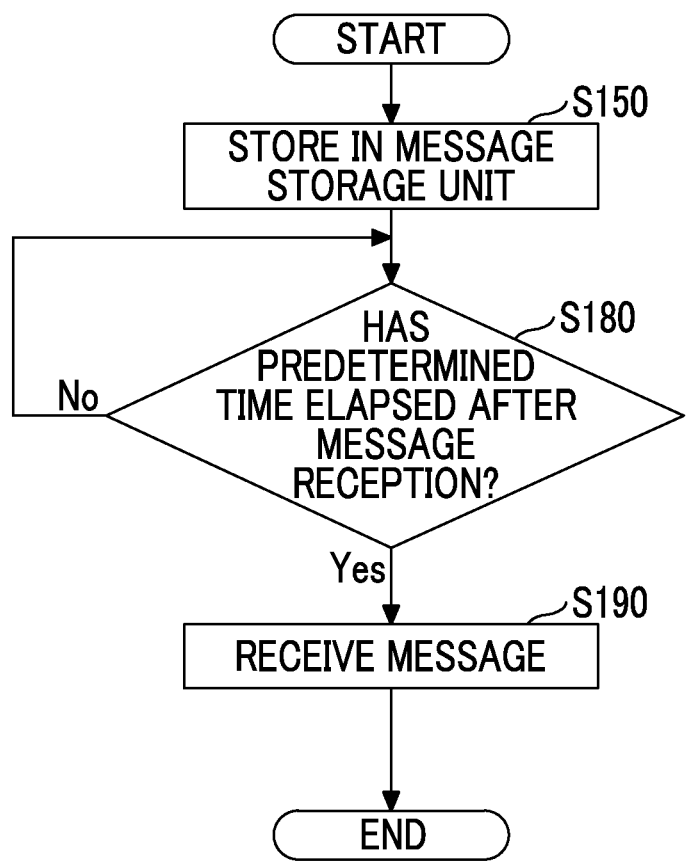
FIG. 10 is a flowchart illustrating an example of an operation of a second electronic control unit according to the third embodiment.

FIG. 10 is a flowchart illustrating an example of an operation of the second electronic control unit according to the third embodiment. FIG. 10 illustrates an example of a method in which the reception determiner 34 of the reception ECU 30 performs a reception determination for the reception message. A series of processes illustrated in FIG. 10 starts when the reception determiner 34 detects that the reception controller 42 has received the reception message from the communication bus 60.

When the reception determiner 34 detects that the reception controller 42 has received the reception message from the communication bus 60, the reception determiner 34 acquires the reception message from the reception message buffer 43. The reception determiner 34 temporarily stores the acquired reception message in the message storage unit 35 (step S150).

The reception determiner 34 determines whether a predetermined time has elapsed after the reception controller 42 receives (acquires) the reception message temporarily stored in the message storage unit 35 from the communication bus 60, until the predetermined time elapses (step S180).

When there is an output of the power-off signal until the predetermined time elapses, the power supply of the reception ECU 30 is forcibly turned off. Accordingly, the reception message temporarily stored in the message storage unit 35 is deleted from the message storage unit 35 regardless of whether or not the reception message is a fraudulent one. Thus, the fraudulent message received by the reception ECU 30 is deleted without being processed by the processor 32.

On the other hand, when there is no output of the power-off signal until the predetermined time elapses, a process of step S190 is performed. In step S190, the processor 32 receives the reception message from the message storage unit 35 after a predetermined time has elapsed since the reception from the communication bus 60, and processes the received reception message. Thus, the processor 32 can correctly process the authorized message received by the reception ECU 30 without incorrectly processing the fraudulent message received by the reception ECU 30.

Although the communication system has been described with reference to the embodiments, the disclosure is not limited to the embodiments. Various modifications and improvements such as a combination or a substitution of a part or all of other embodiments can be performed within the scope of the disclosure.

For example, the ECU may be a relay device (specifically, a gateway device) that relays a message. Further, a message transmitted and received between the transmission ECU 10 and the reception ECU 30 may be via a relay device. Further, the technology of the disclosure is also applicable to, for example, a communication system using Ethernet (registered trademark).

What is claimed is:

1. A communication system comprising:
a first electronic control unit;
a second electronic control unit; and
a communication bus to which the first electronic control unit and the second electronic control unit are connected,
wherein the first electronic control unit is configured to
control transmission of a transmitting message to the communication bus via a control area network,
control reception of a reception message from the communication bus via the control area network,
determine whether or not the reception message received from the communication bus corresponds to a communication message which is predetermined to be transmitted to the communication bus, and
determine whether or not the communication message was transmitted to the communication bus by the first electronic control unit, and
the second electronic control unit is configured to
receive the communication message from the communication bus; and
store the communication message,
wherein the first electronic control unit is configured to
output a notification signal to the second electronic control unit for deleting the stored communication message when the first electronic control unit determines that the reception message corresponds to the communication message and determines that the communication message was not transmitted to the communication bus by the first electronic control unit; and
turn off a power supply of the second electronic control unit by outputting the notification signal, and
the second electronic control unit is configured to delete the stored communication message from the second electronic control unit; and
the second electronic control unit is further configured such that the communication message that the second electronic control unit acquires from the communication bus is deleted from the second electronic control unit by turning off the power supply.

2. The communication system according to claim 1, wherein the second electronic control unit is configured to
store the communication message acquired from the communication bus,
receive and process the stored communication message after a predetermined time has elapsed from acquisition of the communication message from the communication bus by the second electronic control unit, and
delete the stored communication message when there is reception or output of the notification signal.

3. The communication system according to claim 1, further comprising a relay including a coil and a first switch, the first switch being connected between the second electronic control unit and a power supply of the second electronic control unit, and the coil being connected between a power supply of the first electronic control unit and a ground of the first electronic control unit, wherein:

the first electronic control unit includes a second switch that is provided between the ground of the first electronic control unit and the coil, and that is configured to be turned on or off by the notification signal; and the power supply of the second electronic control unit is turned off by turning the second switch off by the notification signal.

4. The communication system according to claim 1, wherein the first electronic control unit is configured to store a transmission completion data indicating that the transmission of the communication message to the communication bus is completed.

5. The communication system according to claim 1, wherein the first electronic control unit is configured to determine whether the reception message corresponds to the communication message by matching the reception message with a communication message list.

* * * * *